United States Patent
Ogata

(10) Patent No.: US 7,080,853 B2
(45) Date of Patent: Jul. 25, 2006

(54) AIRBAG FOR HEAD-PROTECTING AIRBAG DEVICE

(75) Inventor: Tetsuya Ogata, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 187 days.

(21) Appl. No.: 10/703,599

(22) Filed: Nov. 10, 2003

(65) Prior Publication Data
US 2004/0100077 A1    May 27, 2004

(30) Foreign Application Priority Data
Nov. 27, 2002    (JP)    ............................ 2002-343782

(51) Int. Cl.
B60R 21/22    (2006.01)
(52) U.S. Cl. ................... 280/730.2; 280/743.1
(58) Field of Classification Search ............. 280/730.2, 280/729, 743.1, 753, 749
See application file for complete search history.

(56) References Cited

U.S. PATENT DOCUMENTS 6,220,625 B1 * 4/2001 Wallner et al. .......... 280/730.2
6,471,240 B1 * 10/2002 Bakhsh et al. .............. 280/729
6,758,492 B1 * 7/2004 Tesch ...................... 280/730.2
2003/0141708 A1 * 7/2003 Enders .................... 280/730.2

FOREIGN PATENT DOCUMENTS

JP    A-2000-335351    12/2000

* cited by examiner

Primary Examiner—David R. Dunn
(74) Attorney, Agent, or Firm—Posz Law Group, PLC

(57) ABSTRACT

An airbag for head-protecting airbag device according to the present invention is normally folded and housed in an upper edge of windows including a front pillar. The airbag includes a gas admissive portion. An inflatable shielding portion of the gas admissive portion includes a plurality of protection portions, at least one of which located toward front end of the airbag acts as front protection portion, and remaining protection portions located rearward of the front protection portion act as rear protection portions. The front protection portion includes a plurality of vertical chambers juxtaposed along the front-rear direction of the vehicle, and each of the vertical chambers is arranged vertically. The rear protection portions include a plurality of horizontal chambers juxtaposed in the vertical direction, and each of the horizontal chambers is arranged along the front-rear direction of the vehicle.

9 Claims, 6 Drawing Sheets

AIRBAG FOR HEAD-PROTECTING AIRBAG DEVICE

The present application claims priority from Japanese Patent Application No. 2002-343782 filed on Nov. 27, 2002, the entirety of which is hereby incorporated into the present application by this reference.

BACKGROUND OF THE INVENTION

1. Field of the Invention

The present invention relates to an airbag for head-protecting airbag device which is normally folded and housed in an upper edge of windows in the interior of vehicle including a front pillar sloping down forward, and deployable to cover the interior of the windows upon inflow of inflation gas.

2. Description of Related Art

In the prior art, Japanese Patent Laid-Open No. 2000-335351 is illustrative of an airbag for head-protecting airbag device which includes a plurality of protection portions juxtaposed along the vehicle's front-rear direction as deployed.

In this airbag, both of a front protection portion arranged forward and a rear protection portion arranged rearward include a plurality of horizontal inflatable chambers arranged along the front-rear direction of the vehicle, and the horizontal chambers are juxtaposed along the vertical direction.

It is usually desired regarding this kind of airbag that a tension along the front-rear direction is exerted in the lower edge of the inflated airbag as well as that the completely inflated airbag covers the vehicle's inner side of windows to protect vehicle occupants.

In the airbag for head-protecting airbag device in the prior art, however, since all the protection portions are constituted by horizontal chambers, the completely inflated airbag does not shrink to reduce its longitudinal length. Accordingly, a great tension along the front-rear direction is hardly exerted in the lower edge of the airbag completely inflated although the airbag is able to secure a wide protection area in the front-rear direction. Especially, a front part of the front protection portion for covering a window at the side of a front seat is folded and housed in a front pillar which is extended from a roof side rail obliquely down and forward. The part attached to and housed in the front pillar is secured to the body in the front pillar at a plurality of positions arranged along the front-rear direction in the upper edge. Accordingly, when the part develops downward, the part occupies a great part of the length of the airbag lower edge in the front-rear direction. Consequently, a tension along the front-rear direction is hardly exerted in the lower edge of the airbag completely inflated.

SUMMARY OF THE INVENTION

An object of the present invention is to provide an airbag for head-protecting airbag device which is able to generate a great tension along the front-rear direction in the lower edge upon deployment, as well as secure a wide protection area in the front-rear direction for protecting vehicle occupants properly.

The object of the present invention is achieved by an airbag for head-protecting airbag device normally folded in an upper edge of windows inside a vehicle including a front pillar sloping down forward, and deployable upon inflow of inflation gas to cover the vehicle's inner side of the windows, the airbag including: a gas admissive portion inflatable by admitting inflation gas while separating an inner side wall and an outer sidewall respectively thereof; and a non-admissive portion admitting no inflation gas, the gas admissive portion including an inflatable shielding portion for covering the vehicle's inner side of the windows upon deployment of the airbag, the inflatable shielding portion including a plurality of protection portions juxtaposed along the front-rear direction of the vehicle as the airbag is completely inflated, out of the plurality of protection portions, at least one protection portion located toward front end of the airbag acting as front protection portion, and remaining protection portions located rearward thereof acting as rear protection portions, the front protection portion including a plurality of vertical chambers juxtaposed along the front-rear direction of the vehicle, each of the vertical chambers being arranged vertically, and the rear protection portion including a plurality of horizontal chambers juxtaposed in the vertical direction, each of the horizontal chambers being arranged in the front-rear direction.

In the airbag according to the present invention, a front end part of the front protection portion is housed in a front pillar which is extended from a roof side rail obliquely down and forward. Since this front protection portion includes a plurality of vertical inflatable chambers, each of the vertical chambers in the front protection portion inflates while shrinking in the front-rear direction upon deployment of the airbag, so that the front lower edge of the front protection portion is tensed rearward of the vehicle in inflation. In other words, there is properly exerted a great tension along the front-rear direction in the lower edge of the airbag part housed in the front pillar, in which a tension is hardly exerted upon deployment of the airbag, and in the lower edge of the front protection portion, by the shrinkage of the vertical chambers in the front protection portion. Consequently, the airbag is able to generate a tension along the front-rear direction in its lower edge.

In the airbag, a rear protection portion located rearward of the front protection portion includes a plurality of horizontal chambers arranged along the front-rear direction and juxtaposed in the vertical direction. Therefore, in the rear protection portion of the airbag completely inflated, degree of shrinkage along the front-rear direction is low, so that a wide protection area in the front-rear direction is secured. Here, if the rear protection portion is configured with a plurality of vertical chambers as in the front protection portion, the individual vertical chambers constituting the rear protection portion shrink in the front-rear direction upon inflation. With this configuration, although a great tension along the front-rear direction is exerted in the lower edge of the airbag upon inflation, a rear lower edge of the rear protection portion is tensed forward of the vehicle, which reduces the protection area in the front-rear direction.

To summarize, in the airbag according to the present invention, forming the front protection portion with a plurality of vertical chambers enables a great tension along the front-rear direction to be exerted in the lower edge of the front protection portion near the front pillar upon completion of inflation of the airbag, while locating a plurality of horizontal chambers in the rear protection portion contributes to suppress the shrinkage in the front-rear direction upon inflation, and thereby securing a great protection area. Consequently, the air bag is able to keep balance of the tension along the front-rear direction exerted in the lower edge and the protection area in the front-rear direction upon deployment.

Therefore, the airbag of the present invention upon deployment is able to generate a great tension along the front-rear direction in the lower edge, and to secure a wide protection area in the front-rear direction, thereby protecting vehicle occupants properly.

It is desired in the abovementioned airbag for head-protecting airbag device that the rear protection portion is provided at either front or rear end of the horizontal chambers juxtaposed vertically with a vertical chamber arranged vertically and communicated with the horizontal chambers.

With this construction, since the vertical chamber located next to the horizontal chambers in the rear protection portion inflates in the vertical direction upon deployment of the airbag, the rear protection portion is prevented from shrinking in the vertical direction. Consequently, the rear protection portion is able to secure an even wider protection area upon deployment of the airbag. The vertical chamber also contributes to supply inflation gas swiftly to the individual horizontal chambers, so that the airbag is able to inflate swiftly.

The airbag for head-protecting airbag device of the present invention may include a rearmost protection portion for covering the vehicle's inner side of a window disposed at the side of a third row seat of the vehicle. In this case, the airbag completely inflated is able to cover the inner side of the window disposed at the side of the third row seat, too.

DESCRIPTION OF PREFERRED EMBODIMENTS

A preferred embodiment of the present invention is described below with reference to the accompanying drawings. However, the invention is not limited to the embodiments disclosed herein. All modifications within the appended claims and equivalents relative thereto are intended to be encompassed in the scope of the claims.

Figure 1:
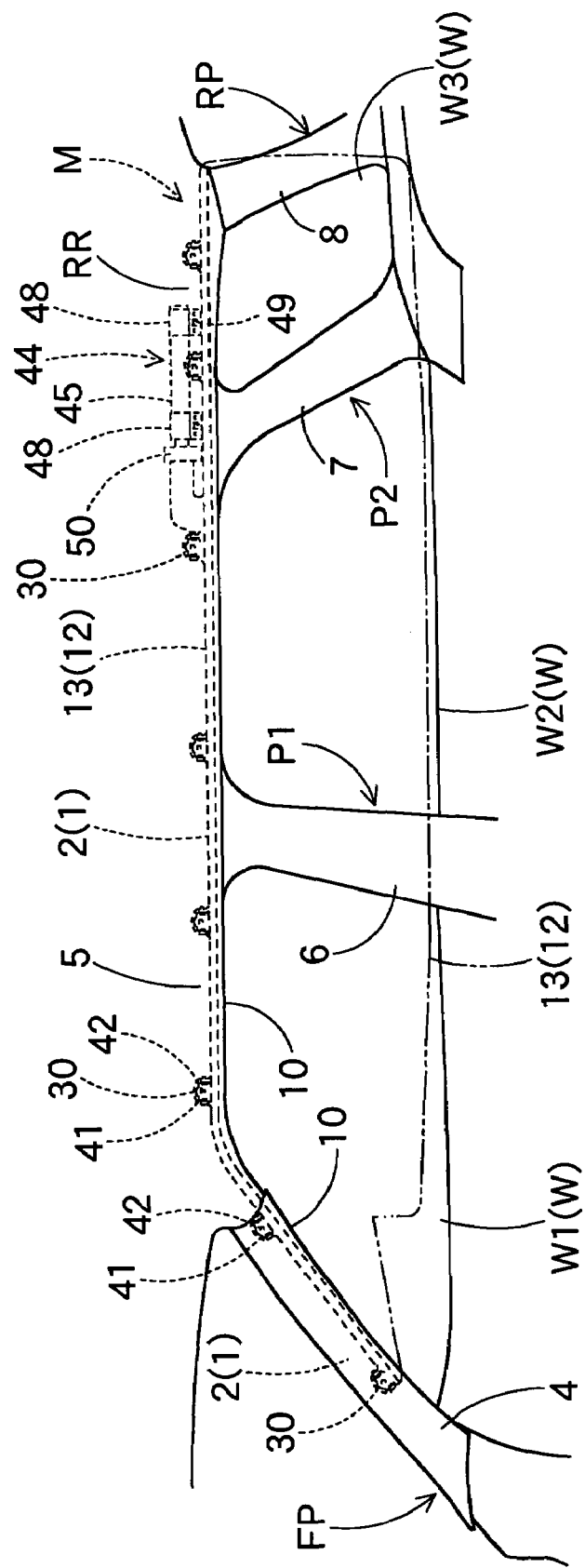
FIG. 1 is a schematic front view of a head-protecting airbag device in which an embodiment of an airbag according to the present invention is employed, as viewed from the vehicle's inner side.

Referring to FIG. 1, an airbag 12 according to the present invention is employed in a head-protecting airbag device M mountable on a vehicle V. The airbag 12 is normally folded and housed in lower edges of a front pillar FP and a roof side rail RR in the upper periphery of doors and windows W (W1, W2 and W3) inside the vehicle.

The airbag device M includes the airbag 12, an inflator 44, mounting brackets 41, 48, and an airbag cover 10.

As shown in FIG. 1, the airbag cover 10 is constituted by the lower edges of each of a pillar garnish 4 arranged on the front pillar FP and a roof head lining 5 arranged on the roof side rail RR. The airbag cover 10 is adapted to cover the interior of the folded and housed airbag 12, and is openable inward of the vehicle pushed by the airbag 12 for allowing the airbag 12 expanding and inflating to protrude inward of the vehicle.

Figure 3:
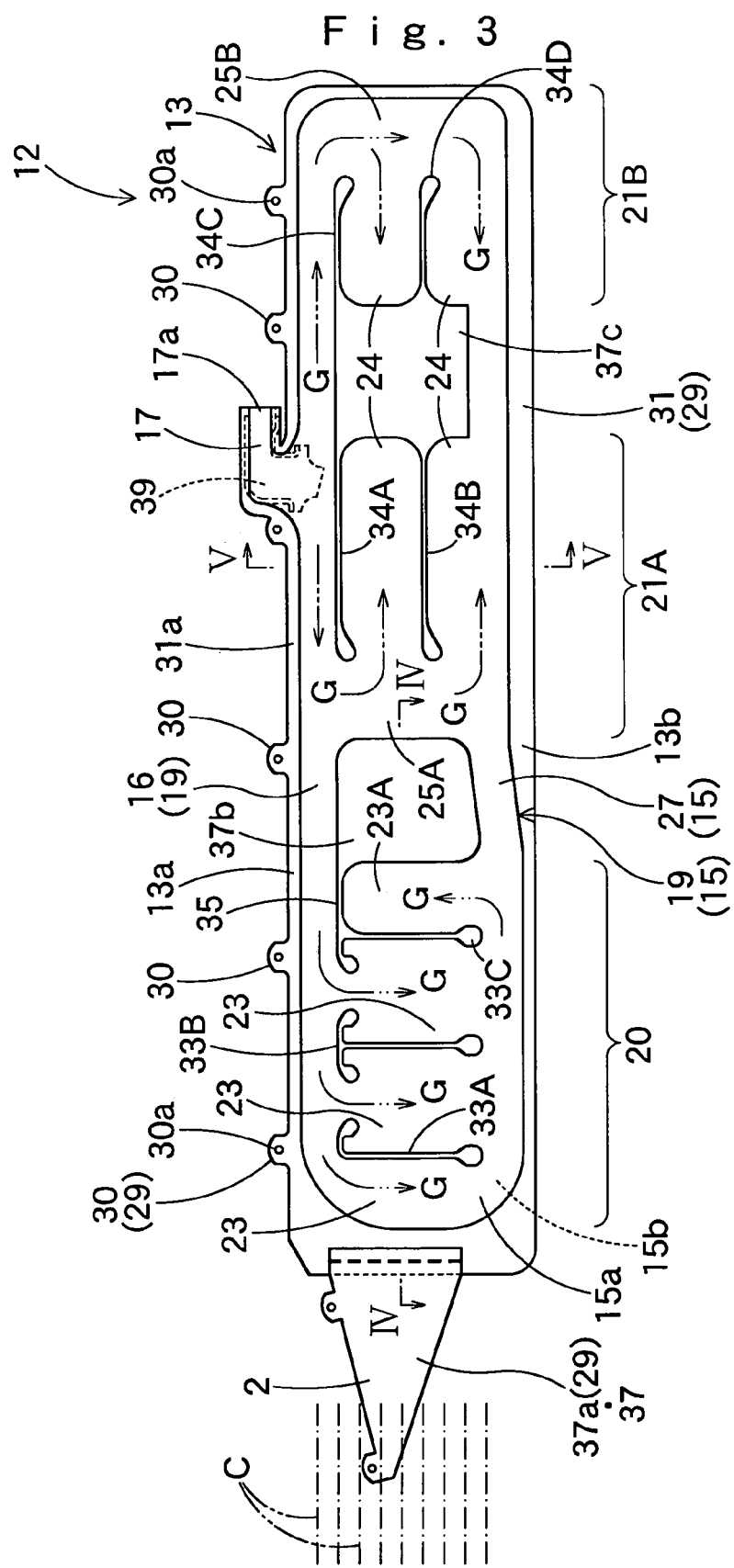
FIG. 3 is a front view of the airbag used in the airbag device of FIG. 1 flatly expanded.
Figure 4:
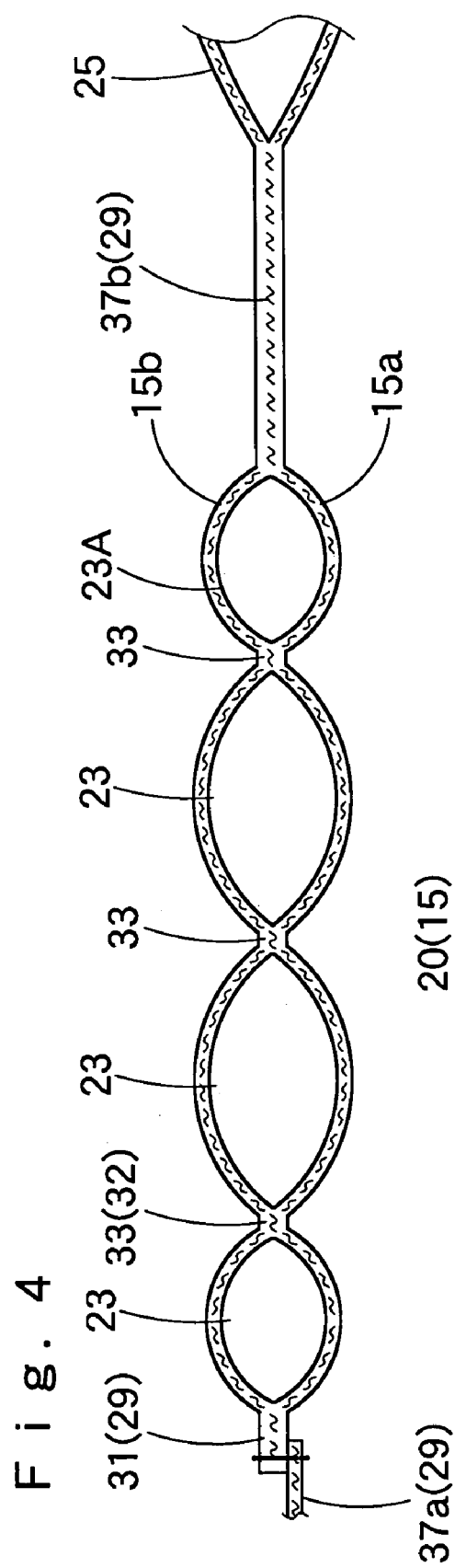
FIG. 4 is an enlarged section taken along line IV—IV of FIG. 3.
Figure 5:
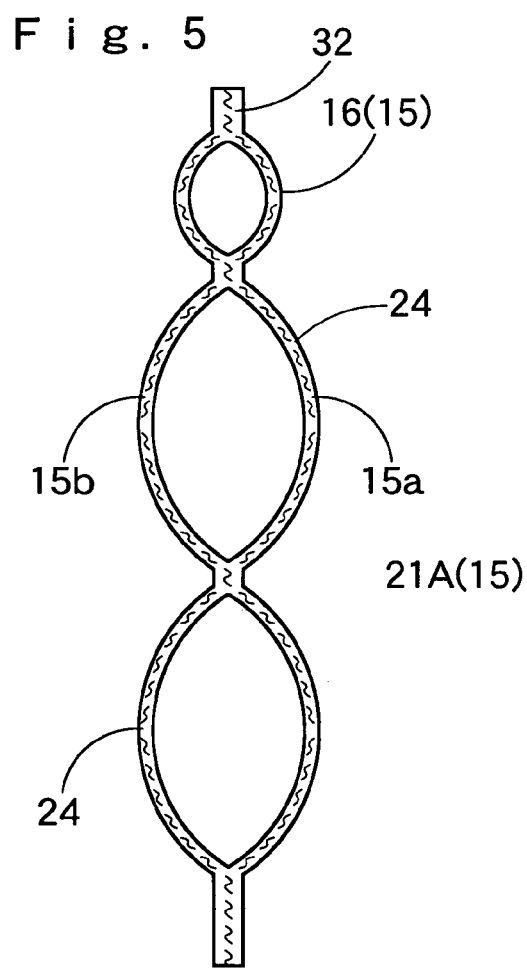
FIG. 5 is an enlarged section taken along line V—V of FIG. 3.

Referring to FIG. 3, the airbag 12 includes a flexible airbag body 13 and a flow regulating cloth 39.

The airbag body 13 is hollow-woven of polyamide yarns or the like. As shown in FIGS. 1 and 3, the airbag body 13 is expanded from folded state upon admitting inflation gas G from the inflator 44, and covers the windows W1 and W2 located in front and rear of a first middle pillar P1, a window W3 between a second middle pillar P2 and a rear pillar RP, and the first and second middle pillars P1, P2 and the rear pillar RP inside the vehicle. The airbag body 13 includes a gas admissive portion 15 which admits inflation gas G inside to separate the vehicle's inner side wall 15a and the vehicle's outer wall 15b, and a non-admissive portion 29 which admits no inflation gas G.

In the foregoing embodiment, the gas admissive portion 15 includes a gas feed passage 16, a gas inlet port 17, and an inflatable shielding portion 19.

The gas feed passage 16 is disposed near the upper edge 13a of the airbag body 13 along the front-rear direction of the vehicle V, over substantially entire length of the airbag body 13. The gas feed passage 16 is adapted to guide the inflation gas G discharged from the inflator 44 to the inflatable shielding portion 19 located below the gas feed passage 16. The gas inlet port 17 is located in a position to the rearward from a longitudinal center of the gas feed passage 16, and is projected upward from the airbag body 13. The gas inlet port 17 is connected to the inflator 44, while being communicated with the gas feed passage 16. In the foregoing embodiment, the gas inlet port 17 is opened at the rear end 17a. The gas inlet port 17 is mounted around a later-described diffuser 46 of the inflator 44 with the flow regulating cloth 39 interposed therebetween, thereby to be connected with the inflator 44. The gas inlet port 17 is connected to the diffuser 46 by means of a later-described cramp 50.

The inflatable shielding portion 19 includes a front protection portion 20 and rear protection portions 21A and 21B all of which are juxtaposed along the front-rear direction of the vehicle, and a communication passage 27 disposed along the lower edge 13b of the airbag body 13.

Figure 7:
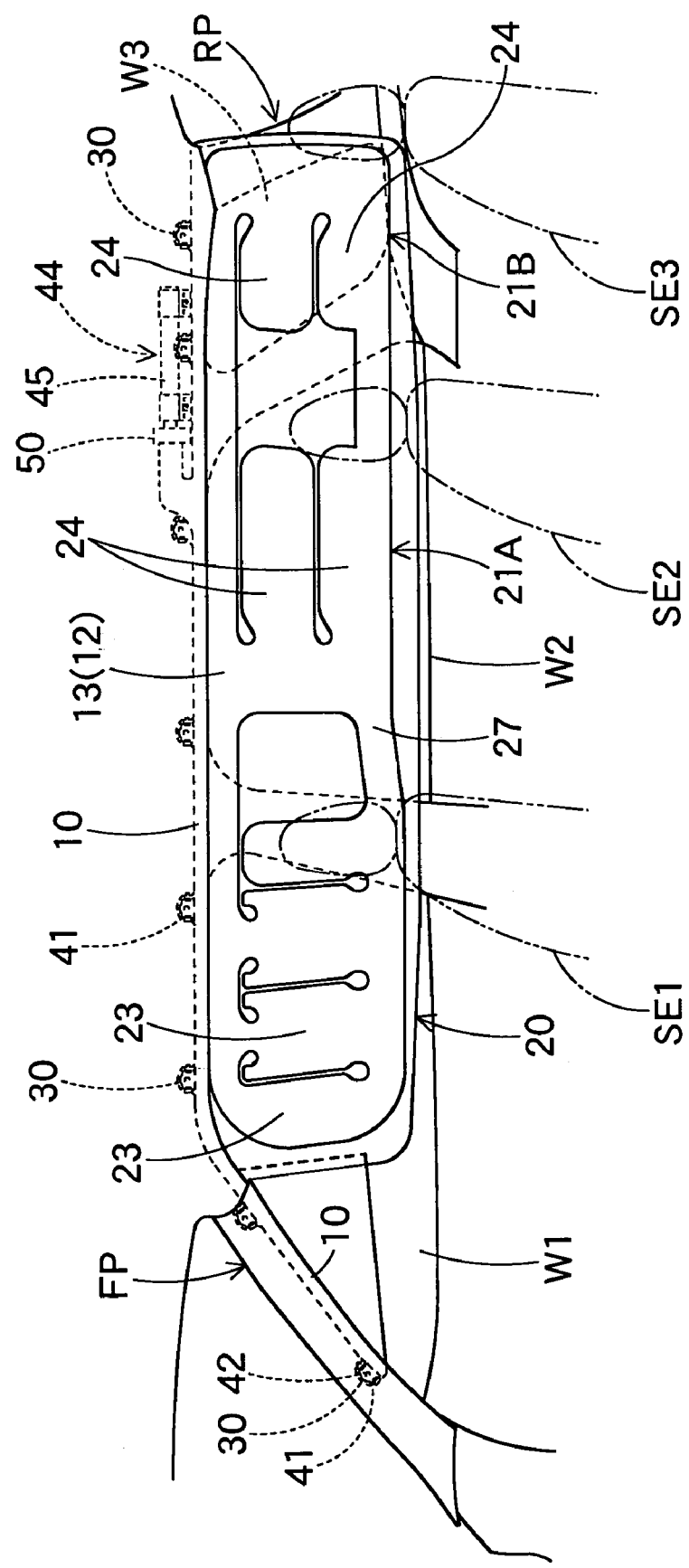
FIG. 7 schematically shows the airbag of FIG. 3 completely inflated.

As referred to FIG. 7, the front protection portion 20 is located toward front end of the airbag for covering the vehicle's interior of the window W1 located at the side of a front seat SE1 as the airbag body 13 is deployed, and includes a plurality of vertical chambers 23 in its area. The vertical chambers 23 are juxtaposed along the front-rear direction of the vehicle V while being partitioned by later-described vertical partitions 33, and each of the vertical chambers 23 is arranged vertically. In the foregoing embodiment, the front protection portion 20 includes four of the vertical chambers 23.

A vertical chamber 23A disposed rearmost of the front protection portion 20 is closed by a later-described closer 35 at the upper end. As shown in FIG. 7, the vertical chamber 23A is to be located in the interior of the first middle pillar P1 when the airbag 12 is completely inflated. That is, by being closed at the upper end, the vertical chamber 23A is able to expand swiftly in a thin state, with little interference with the pillar garnish 6 disposed at the vehicle's inner side of the first middle pillar P1, in the initial stage of deployment of the airbag 12. Each of the vertical chambers 23 other than the vertical chamber 23A is communicated with the gas feed passage 16 at the upper end. The vertical chambers 23 including the chamber 23A are communicated with the communication passage 27 at the lower end.

The rear protection portions 21A and 21B are located rearward of the front protection portion 20 for covering the vehicle's interior of the windows W2 and W3 located at the side of second and third row seats SE2 and SE3 as the airbag body 13 is deployed, respectively, and include a plurality of horizontal chambers 24 in their areas. The horizontal chambers 24 are juxtaposed in the vertical direction of the vehicle V while being partitioned by later-described horizontal partitions 34, and each of the horizontal chambers 24 is arranged along the front-rear direction of the vehicle. In the foregoing embodiment, each of the rear protection portions 21A and 21B includes two of the horizontal chambers 24.

The rear protection portion 21A is provided in its front most part with a vertical chamber 25A. The rear protection portion 21B is provided in its rearmost part with a vertical chamber 25B. Each of the vertical chambers 25A and 25B is communicated with each of the horizontal chambers 24. Each of the vertical chambers 25A and 25B is communicated at the upper end with the gas feed passage 16, and is communicated at the lower end with the communication passage 27.

The communication passage 27 is disposed along the lower edge 13b of the airbag body 13 and along the front-rear direction of the vehicle V, over substantially entire length of the airbag body 13. In the foregoing embodiment, the communication passage 27 shares its part with each of the horizontal chambers 24 located in the lower part of the rear protection portions 21A and 21B.

The non-admissive portion 29 is formed by joining the vehicle's inner side wall 15a and the vehicle's outer side wall 15b, and includes a plurality of mounting portions 30, a peripheral portion 31, a partitioning portion 32 and a panel portion 37.

The peripheral portion 31 is located around and neighbors the gas admissive portion 15, and is so densely formed as not to cause gas leakage.

The mounting portions 30 are formed, in the foregoing embodiment, at eight positions in the upper edge 31a of the peripheral portion 31 and the upper edge of later-described triangular panel portion 37a of the panel portion 37 in the upper edge 13a of the airbag body 13, and are projected upward therefrom. Each of the mounting portions 30 is provided with a mounting hole 30a for a mounting bolt 42, and a mounting bracket 41 is attached thereto for attachment of the airbag body 13 to an inner panel 2 of a vehicle body 1. Each of the mounting portions 30 is secured to the inner panel 2 of sheet metal together with the mounting bracket 41 by means of the mounting bolt 42.

The panel portion 37 includes a triangular panel portion 37a located at the front end of the airbag body 13, and rectangular panel portions 37b and 37c disposed in the area of the inflatable shielding portion 19 of the airbag body 13.

The triangular panel portion 37a is projected forward from the front edge of the peripheral portion 31, and is provided at the front end and a middle position in the upper edge with mounting portions 30. In the foregoing embodiment, the triangular panel portion 37a is formed of woven fabric of polyamide yarns, polyester yarns or the like, separately from the airbag body 13, and is sewn to the front edge of the peripheral portion 31.

The rectangular panel portion 37b is located in an area defined by the front protection portion 20, the rear protection portion 21A, the gas feed passage 16 and the communication passage 27. The rectangular panel portion 37c is located in an area defined by the rear protection portion 21A, the rear protection portion 21B, the gas feed passage 16 and the communication passage 27.

The partitioning portion 32 is located in the area of the inflatable shielding portion 19, and includes each plurality of vertical partitions 33 and horizontal partitions 34. The vertical partitions 33 are juxtaposed along the front-rear direction in the area of the front protection portion 20 to partition the individual vertical chambers 23 and 23A. In the foregoing embodiment, three vertical partitions 33 are provided, and each of the vertical partitions 33 takes a rod shape arranged vertically. The frontmost vertical partition 33A is formed in a substantially inverted-J shape. The remaining vertical partitions 33B and 33C are formed in substantially T-shape. The vertical partition 33C located in front of the vertical chamber 23A is joined at the upper end with the closer 35 extended from the upper edge of the rectangular panel portion 37b and arranged along the front-rear direction.

The horizontal partitions 34 are juxtaposed in the vertical direction in each area of the rear protection portions 21A and 21B to partition the horizontal chambers 24. In the foregoing embodiment, two each of the horizontal partitions 34 are provided in each of the rear protection portions 21A and 21B, and each of the horizontal partitions 34 has a rod shape arranged along the front-rear direction. The horizontal partitions 34A and 34B disposed in the area of the rear protection portion 21A are joined at the rear ends with the rectangular panel portion 37c. The horizontal partitions 34C and 34D disposed in the area of the rear protection portion 21B are joined at the front ends with the rectangular panel portion 37c. Moreover, the horizontal partitions 34A and 34C located in the upper side are formed extendedly from the upper edge of the rectangular panel portion 37c, and constitute the lower edge of the gas feed passage 16.

Figure 6:
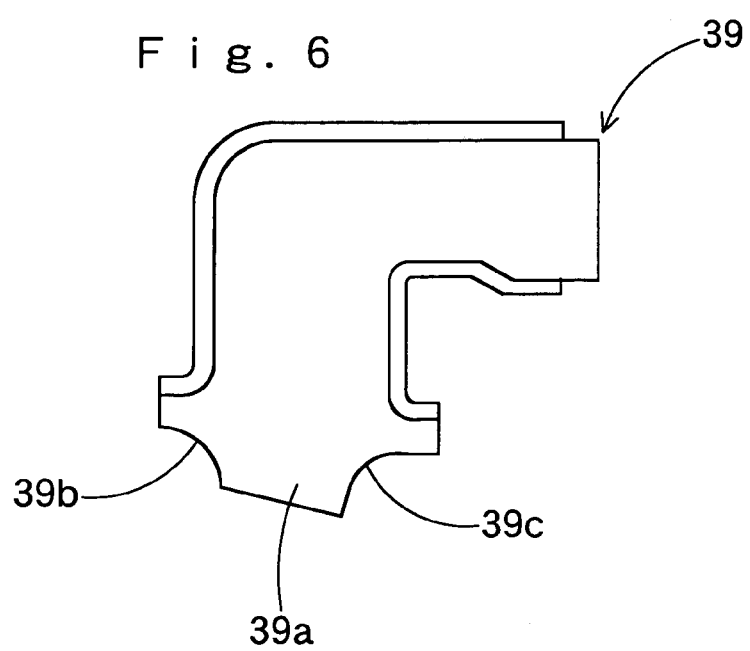
FIG. 6 is a front view of a flow regulating cloth used in the airbag of FIG. 3.

The flow regulating cloth 39 in the foregoing embodiment is hollow-woven as the airbag body 13, and is mounted around the diffuser 46 of the inflator 44 inside the gas inlet port 17, as shown in FIG. 3. Referring to FIGS. 3 and 6, the flow regulating cloth 39 is so bent that the leading end 39a side is located within the gas feed passage 16. At the leading end 39a of the flow regulating cloth 39, there are opened gas outlet ports 39b and 39c for emitting inflation gas, respectively toward the lower front and toward the lower rear.

Figure 2:
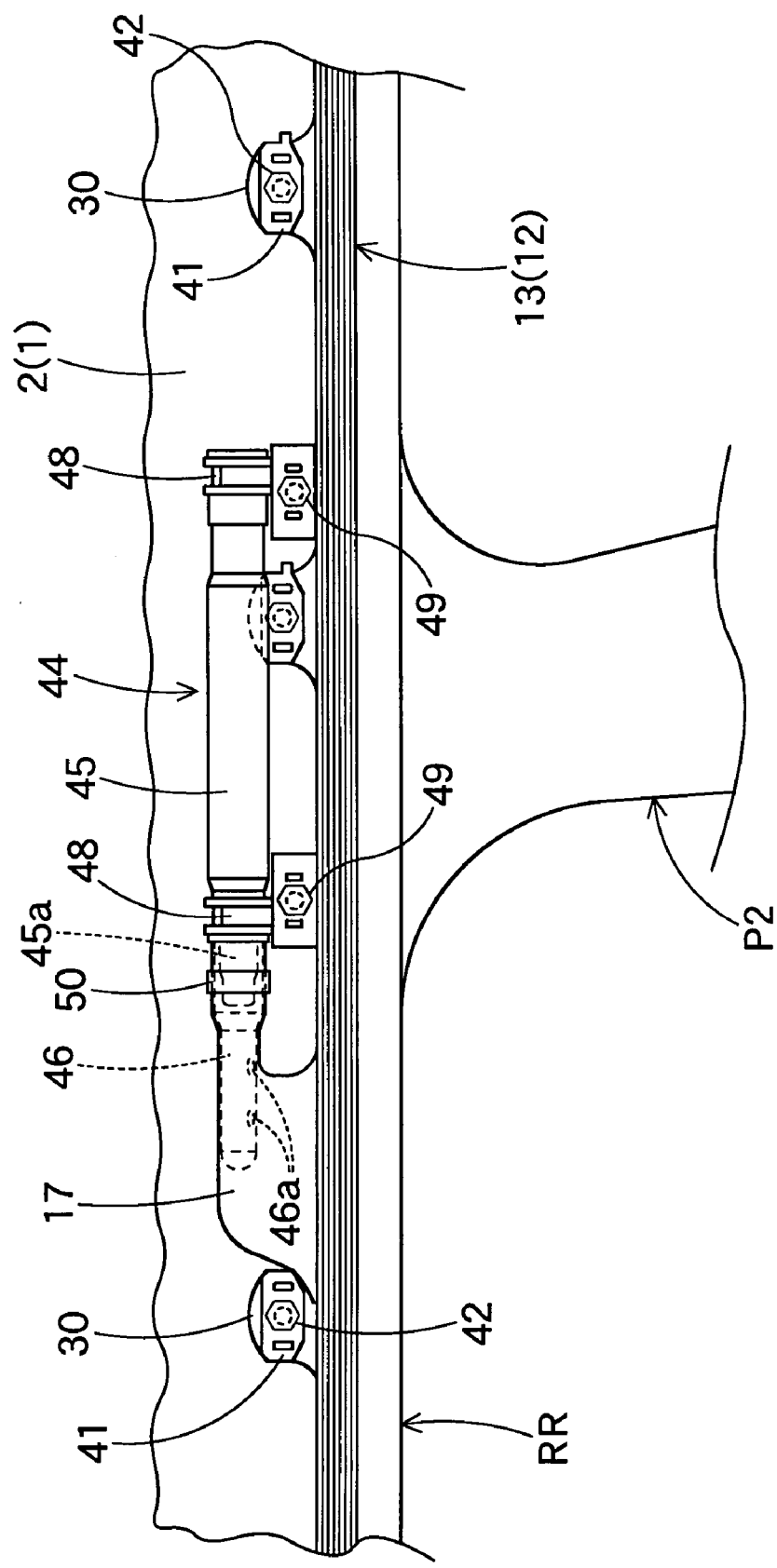
FIG. 2 is a partial enlarged section of an arrangement position of an inflator in the airbag device of FIG. 1.

Referring back to FIGS. 1 and 2, the inflator 44 includes a main body 45 for supplying inflation gas G to the folded airbag 12, and a diffuser 46 for guiding the inflation gas G discharged from the main body 45.

The main body 45 has a substantially cylindrical shape, and includes a head portion 45a at the leading end. The head portion 45a is provided with not-shown gas discharge ports for discharging inflation gas.

The diffuser 46 is formed of a metal pipe member having a substantially cylindrical shape closed at the leading end, and is fitted around the top end of the main body 45 at the root side, thus covering the head 45a. The diffuser 46 is provided at lower surface toward the leading end with two gas discharge ports 46a juxtaposed along front-rear direction of the vehicle V. The diffuser 46 is sheathed with the flow regulating cloth 39 and the gas inlet port 17 of the airbag body 13, and is connected to the airbag 12 by means of a cramp 50 mounted around the rear end 17a of the gas inlet port 17.

The inflator 44, with the diffuser 46 fitted at the leading end of the main body 45, is attached to the inner panel 2 of the body 1 along the front-rear direction of the vehicle V, by means of a mounting bracket 48 and a mounting bolt 49.

Mounting of the airbag 12 on the vehicle V is now described. Firstly, the flow regulating cloth 39 is inserted into the gas inlet port 17 of the airbag body 13, so that the airbag 12 is formed. Then the airbag 12 is folded. More specifically, the airbag body 13 is folded up from flat expanded state, in a bellows fashion subsequently on crest and valley folds C, as indicated by single-dotted lines in FIG. 3, so that the lower edge 13b of the body 13 is brought close to the upper edge 13a. Then the folded airbag body 13 is wrapped up at predetermined positions by a not-shown breakable wrapping member for keeping the folded-up configuration. Thereafter, the mounting brackets 41 are fixed to the individual mounting portions 30. The cramp 50 is mounted around the gas inlet port 17, and the mounting bracket 48 is attached to the inflator 44.

Then the gas inlet port 17 of the airbag body 13 with the cramp 50 is mounted around the diffuser 46 of the inflator 44 while interposing the flow regulating cloth 39 in between. Then the cramp 50 is fastened to join the diffuser 46 and the airbag 12. Thus an airbag module is assembled.

Thereafter, the individual mounting brackets 41 and 48 are secured to predetermined positions of the inner panel 2 by the bolts 42 and 49, so that the airbag module is mounted on the body 1. Subsequently, a not-shown lead wire leading from a predetermined control device for actuating the inflator is connected to the inflator 44. If the pillar garnish 4, the roof head lining 5, and further the pillar garnishes 6, 7 and 8 are attached to the body 1, the airbag 12 is mounted on the vehicle V together with the airbag device M.

When the inflator 44 is actuated after the airbag device M is mounted on the vehicle V, the inflation gas G from the inflator 44 flows into the gas feed passage 16 via the gas inlet port 17, as shown by double-dotted lines in FIG. 3. The inflation gas G subsequently flows into the inflatable shielding portion 19 from the gas feed passage 16, then the inflatable shielding portion 19 starts to inflate while being unfolded. The airbag body 13 then breaks the wrapping member, pushes and opens the airbag cover 10 in the lower edges of the pillar garnish 4 and the roof head lining 5, and protrudes downward to cover the vehicle's inner side of the windows W1, W2 and W3 and the middle pillars P1, P2, and the rear pillar RP as shown in FIGS. 1 and 7, while expanding and inflating.

In the airbag 12 according to the present invention, a front end part of the front protection portion 20 is housed in the front pillar FP which is extended from the roof side rail RR obliquely downward and forward. Since the front protection portion 20 includes a plurality of vertical chambers 23, each of the vertical chambers 23 in the front protection portion 20 inflates while shrinking in the front-rear direction upon deployment of the airbag 12, so that the front lower edge of the front protection portion 20 is tensed rearward of the vehicle in inflation. In other words, there is properly exerted a great tension along the front-rear direction in the lower edge of the airbag part housed in the front pillar FP (or the triangular panel portion 37a), in which a tension is hardly exerted upon deployment of the airbag 12, and in the lower edge of the front protection portion 20, by the shrinkage of the vertical chambers 23 of the front protection portion 20. Consequently, the airbag 12 is able to generate a tension along the front-rear direction in its lower edge.

Moreover, in the airbag 12, the rear protection portions 21A and 21B located rearward of the front protection portion 20 include a plurality of horizontal chambers 24 arranged along the front-rear direction and juxtaposed in the vertical direction. Therefore, in the rear protection portions 21A and 21B of the airbag 12 completely inflated, degree of shrinkage in the front-rear direction is low, so that a wide protection area in the front-rear direction is secured. Here, if the rear protection portions are configured with a plurality of vertical chambers as in the front protection portion, the individual vertical chambers constituting the rear protection portions shrink in the front-rear direction upon inflation. With this configuration, although a great tension along the front-rear direction is exerted in the lower edge of the airbag upon inflation, a rear lower edge of the rear protection portions is tensed forward of the vehicle, which reduces the area for protection in the front-rear direction.

To summarize, in the airbag 12 according to the present invention, forming the front protection portion 20 with a plurality of vertical chambers 23 enables a great tension along the front-rear direction to be exerted in the lower edge of the front protection portion 20 near the front pillar FP upon completion of inflation of the airbag 12, while locating a plurality of horizontal chambers 24 in the rear protection portions 21A and 21B contributes to suppress the shrinkage in the front-rear direction upon inflation, and thereby securing a great area for protection. Consequently, the airbag 12 is able to keep balance of the tension along the front-rear direction exerted in the lower edge and the area for protection in the front-rear direction upon deployment.

Therefore, the airbag 12 of the present invention upon deployment is able to generate a great tension along the front-rear direction in the lower edge, and to secure a protection area wide in the front-rear direction, thereby protecting vehicle occupants properly.

In the airbag 12, furthermore, each of the rear protection portions 21A and 21B is provided at its either front or rear end side of the horizontal chambers 24 juxtaposed vertically with a vertical chamber 25 which is vertically arranged and communicated with the horizontal chambers 24. Upon airbag 12 deployment, accordingly, each of the vertical chambers 25A and 25B located next to the horizontal chambers 24 in the rear protection portions 21A and 21B inflates in the vertical direction, so that the rear protection portions 21A and 21B formed with the horizontal chambers 24 are prevented from shrinking in the vertical direction. Consequently, the rear protection portions 21A and 21B are able to secure an even wider protection area upon deployment of the airbag 12. The vertical chambers 25A and 25B also contribute to supply inflation gas swiftly to the individual horizontal chambers 24, so that the airbag 12 is able to inflate swiftly.

Although the preferred embodiment shows each one vertical chamber located respectively at the front end of the rear protection portion 21A and at the rear end of the rear protection portion 21B, each of the rear protection portions may be provided at both front and rear ends with vertical chambers, for example. It will also be appreciated that one vertical chamber is so formed between two rear protection portions juxtaposed in the front-rear direction as to be shared by these two rear protection portions.

Although the preferred embodiment shows the airbag 12 having one front protection portion 20 located toward the front end of the airbag and two rear protection portions 21A and 21B located rearward of the front protection portion 20, it will also be appreciated to employ an airbag having two front protection portions in the front side and one rear protection portion rearward of the front protection portions.

Although the preferred embodiment is exemplified by the airbag 12 which includes the rear protection portion 21B for covering the interior of the window W3 disposed at the side of the third row seat SE3 in the vehicle V, the airbag according to the present invention is not limited to this. The airbag according to the present invention may be mounted on a vehicle with two-row seatings of front seat and rear seat. In this case, the airbag is provided rearward of the front protection portion with one rear protection portion.

What is claimed is:

1. An airbag for head-protecting airbag device normally folded in an upper edge of windows inside a vehicle including a front pillar sloping down forward, and deployable upon inflow of inflation gas to cover the vehicle's inner side of the windows, the airbag comprising: a gas admissive portion inflatable by admitting inflation gas while separating an inner side wall and an outer side wall respectively thereof; and a non-admissive portion admitting no inflation gas, the gas admissive portion comprising an inflatable shielding portion for covering the vehicles s inner side of the windows upon deployment of the airbag, the inflatable shielding portion comprising a plurality of protection portions juxtaposed along the front-rear direction of the vehicle as the airbag is completely inflated, out of the plurality of protection portions, at least one protection portion located toward a front end of the airbag acting as a front protection portion, and remaining protection portions located rearward thereof acting as at least one rear protection portion, the front protection portion comprising a plurality of vertical chambers juxtaposed along the front-rear direction of the vehicle, each of the vertical chambers being arranged vertically, each of the vertical chambers having a width in the vertical direction set larger than a width in a front-rear direction, and the at least one rear protection portion comprising a plurality of horizontal chambers juxtaposed in the vertical direction, the horizontal chambers having a rod shaped horizontal partition arranged therebetween, each of the horizontal chambers being adjacent and arranged along the front-rear direction, each of the horizontal chambers having a width in the front-rear direction set larger than a width in the vertical direction, each rod shaped horizontal partition being arranged along the front-rear direction, wherein, upon deployment of the airbag, the front protection portion has a shrinking ratio in the front-rear direction larger than the shrinking ratio of the at least one rear protection portion in the front-rear direction.

2. The airbag for head-protecting airbag device according to claim 1, the at least one rear protection portion including at least one vertical chamber, wherein the horizontal chambers are juxtaposed vertically, and wherein the at least one rear protection portion is provided at at least one of a front and rear end with the at least one vertical chamber, the at least one vertical chamber being arranged vertically and communicated with the horizontal chambers.

3. The airbag for head-protecting airbag device according to claim 1, wherein the rearmost protection portion of the airbag covers the vehicles s inner side of a window disposed at the side of a third row seat of the vehicle upon deployment of the airbag.

4. The airbag for head-protecting airbag device according to claim 1, wherein there are provided two of the at least one rear protection portion.

5. The airbag for head-protecting airbag device according to claim 1, wherein there are provided four vertical chambers of the front protection portion.

6. The airbag for head-protecting airbag device according to claim 5, wherein one vertical chamber of the plurality of vertical chambers of the front protection portion includes a closer at an upper end of the one vertical chamber.

7. The airbag for head-protecting airbag device according to claim 1, further comprising a triangular panel portion projected forward from a front edge of the inflatable shielding portion.

8. The airbag for head-protecting airbag device according to claim 1, wherein each of the vertical chambers of the front protection portion are communicated with an adjacent vertical chamber at least on a vertical end side.

9. The airbag for head-protecting airbag device according to claim 2, wherein each of the horizontal chambers of the at least one rear protection portion are communicated with an adjacent horizontal chamber at least on a horizontal end side via the at least one vertical chamber of the at least one rear protection portion.

* * * * *